United States Patent
Stücker

(10) Patent No.: US 11,897,098 B2
(45) Date of Patent: Feb. 13, 2024

(54) AUTOMATIC INSTALLATION MACHINE FOR AN INSTALLATION TOOL FOR A WIRE THREAD INSERT, AND INSTALLATION METHOD

(71) Applicant: BÖLLHOFF VERBINDUNGSTECHNIK GmbH, Bielefeld (DE)

(72) Inventor: Daniel Stücker, Rietberg (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 18/020,979

(22) PCT Filed: Aug. 6, 2021

(86) PCT No.: PCT/EP2021/071972
§ 371 (c)(1),
(2) Date: Feb. 13, 2023

(87) PCT Pub. No.: WO2022/033967
PCT Pub. Date: Feb. 17, 2022

(65) Prior Publication Data
US 2023/0226673 A1    Jul. 20, 2023

(30) Foreign Application Priority Data

Aug. 13, 2020    (EP) .................................... 20190871

(51) Int. Cl.
*B25B 27/14* (2006.01)
*B21F 3/02* (2006.01)

(52) U.S. Cl.
CPC .............. *B25B 27/143* (2013.01); *B21F 3/02* (2013.01)

(58) Field of Classification Search
CPC ...... B25B 27/143; B23P 19/107; B23P 19/12; B23P 19/048; B21F 3/02
See application file for complete search history.

(56) References Cited

U.S. PATENT DOCUMENTS 2,363,789 A    11/1944 Haas
4,563,119 A    1/1986 Cosenza
(Continued)

FOREIGN PATENT DOCUMENTS

CH    261878 A    5/1949
CN    104227394 A    12/2014
(Continued)

OTHER PUBLICATIONS

Written Opinion & International Search Report for PCT/EP2021/071972 dated Nov. 12, 2021, (13 pages).
(Continued)

*Primary Examiner* — Sarang Afzali
(74) *Attorney, Agent, or Firm* — Reising Ethington P.C.

(57) ABSTRACT

An automatic installation machine, which is connectable to a tool so as to install a wire thread insert in a thread bore, includes a drive unit providing movement between a first and a second rotation direction, a setting spindle in rotation coupling with the drive unit so that during a transmission of a rotation movement from the drive unit, the setting spindle is displaceable in longitudinal direction independent of the rotation movement. A first pneumatic cylinder has a movable piston oriented parallel to the longitudinal direction of the setting spindle and coupled with an offset with the setting spindle so that the setting spindle is axially displaceable by the pneumatic cylinder. An actuating mandrel is arranged within the setting spindle and is driven rotation free, and the (Continued)

Figure 1:
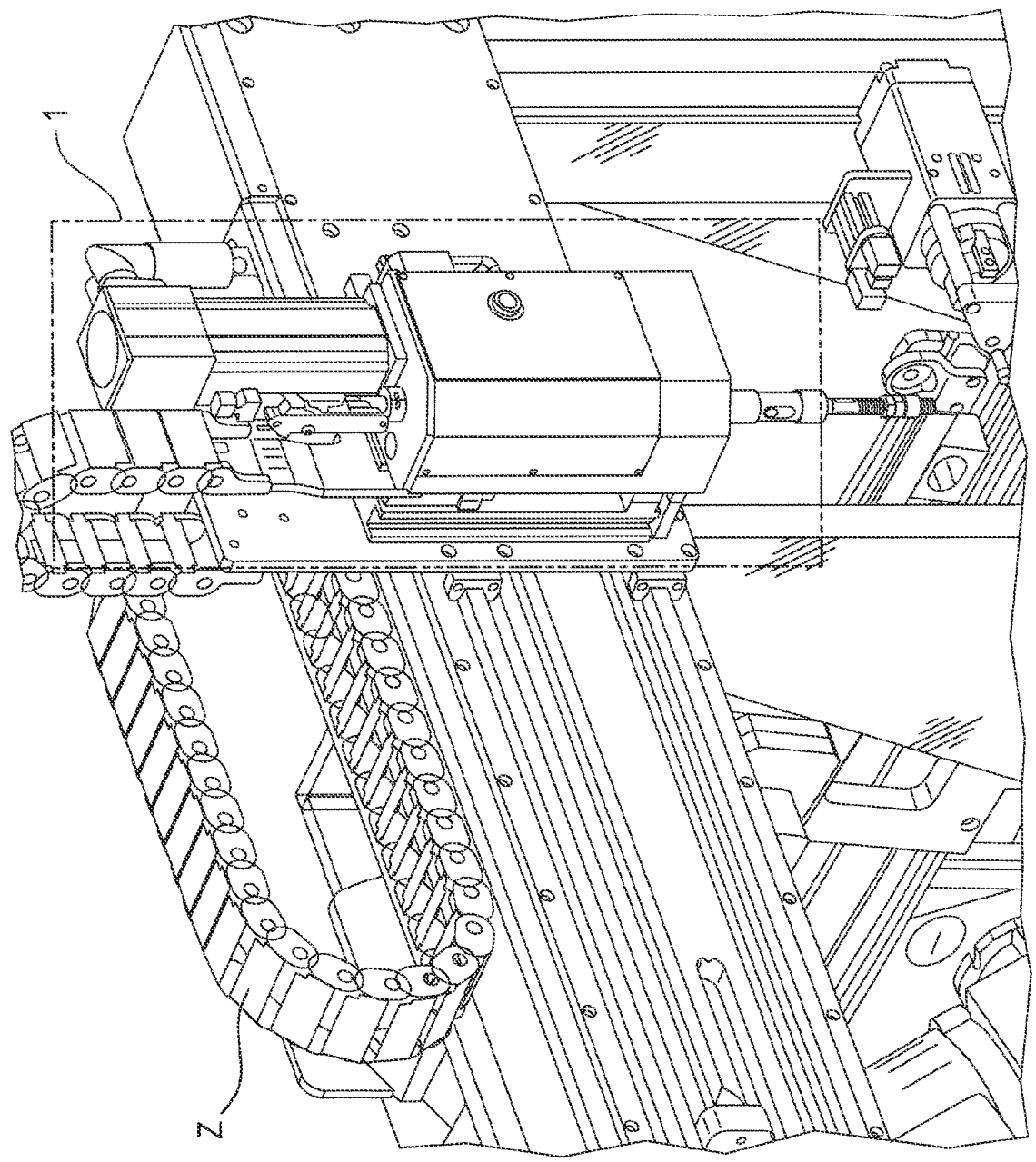

installation machine includes a tool chuck via which the tool for installing the insert is connectable with the setting spindle.

9 Claims, 10 Drawing Sheets

(56) References Cited

U.S. PATENT DOCUMENTS

| | | | |
|---|---|---|---|
| 4,645,398 A | 2/1987 | Cosenza et al. | |
| 6,146,073 A | 11/2000 | Kobusch | |
| 6,367,138 B1 | 4/2002 | Newton et al. | |
| 6,470,557 B2 | 10/2002 | Newton et al. | |
| 6,704,984 B2 | 3/2004 | Szewc et al. | |
| 6,860,173 B2 | 3/2005 | Newton et al. | |
| 8,474,118 B2 | 7/2013 | Hondo | |
| 8,495,807 B2 | 7/2013 | Szewc et al. | |
| 9,719,546 B2 | 8/2017 | Thommes et al. | |
| 10,704,589 B2 | 7/2020 | Thommes et al. | |
| 10,774,868 B2 | 9/2020 | Thommes et al. | |
| 10,883,527 B2 | 1/2021 | Thommes et al. | |
| 11,565,391 B2 | 1/2023 | Marxkors et al. | |
| 2002/0066172 A1 | 6/2002 | Newton et al. | |
| 2003/0024594 A1 | 2/2003 | Szewc et al. | |
| 2021/0060746 A1 | 3/2021 | Marxkors et al. | |

FOREIGN PATENT DOCUMENTS

| | | |
|---|---|---|
| CN | 109434431 A | 3/2019 |
| CN | 110114190 A | 8/2019 |
| CN | 110422814 A | 11/2019 |
| DE | 60008330 T2 | 12/2004 |
| EP | 0140812 A1 | 5/1985 |
| EP | 0157715 A2 | 10/1985 |
| EP | 0983445 B1 | 3/2002 |
| EP | 1084800 B1 | 2/2004 |
| EP | 1428627 A2 | 6/2004 |
| EP | 2637825 B1 | 7/2020 |
| GB | 842342 A | 7/1960 |
| JP | 2001113473 A | 4/2001 |
| JP | 2004195642 A | 7/2004 |
| JP | 4180510 B2 | 11/2008 |
| JP | 2011005634 A | 1/2011 |
| WO | WO2012015018 A1 | 2/2012 |
| WO | WO2012062604 A1 | 5/2012 |
| WO | WO2018114122 A1 | 6/2018 |
| WO | WO2019141497 A1 | 7/2019 |

OTHER PUBLICATIONS

EP Intention to Grant for EP Application No. 20190871.2 dated Oct. 11, 2022 (7 pages).

English Translation, EP Intention to Grant for EP Application No. 20190871.2 dated Oct. 11, 2022 (6 pages).

English translation of the International Preliminary Report on Patentability for for PCT/EP2021/071972 dated Feb. 7, 2023, (7 pages).

JP Office Action for JP Application No. 2023-510335 dated Sep. 19, 2023 (8 pages).

CN Office Action for CN Application No. 202180055341.7 dated Sep. 30, 2023 (11 pages).

AUTOMATIC INSTALLATION MACHINE FOR AN INSTALLATION TOOL FOR A WIRE THREAD INSERT, AND INSTALLATION METHOD

1. TECHNICAL FIELD

The present disclosure is related to an automatic installation machine that is connectable with an installation tool for a wire thread insert in a thread bore of a component to automatically install a wire thread insert in this thread bore. Furthermore, the present disclosure relates to an automatic installation machine in combination with such an installation tool. Furthermore, the present disclosure relates to an installation method for a wire thread insert in a thread bore of a component with the automatic installation machine.

2. BACKGROUND

Different wire thread inserts for the installation in a bore with a receiving thread of a component are known in the state of the art. These wire thread inserts are for example described in U.S. Pat. No. 2,363,789, EP-A-0 140 812 and EP-A-0 157 715. It is regularly the case that the outer diameter of the cylindrical helix of the wire thread insert must be chosen slightly bigger than the inner diameter of the receiving thread of the component. It is guaranteed by that that due to the elastic recovery of the wire thread insert after the installation in the receiving thread, a firm fit of the wire thread insert is achieved.

Different configurations of wire thread inserts are for example described in EP-B1-0 983 445. Part of this is for example the wire thread insert that consists of a cylindrical helix with a number of helically wound windings. A first winding of this cylindrical helix ends in an installation tang projecting radially straight into the cylindrical helix. With the help of a suitable installation tool, this installation tang is gripped and by that, the wire thread insert is installed in the receiving thread of the component or screwed into it. After completion of the installation, the installation tang is removed by breaking it off in the first helix with the help of a predetermined breaking point. In this way, a receiving thread is achieved having a wire thread insert that can be continuously screwed in.

Such wire thread inserts with an installation tang to be broken are installed with the help of an automatic installation machine and an associated installation tool, as is described in EP 1 428 627 A2 as well as in DE 600 08 330 T2. Despite constructive differences of the two mentioned automatic installation machines, the basic construction uses a rotating drive unit, that is an electric engine, to deliver the installation spindle with the wire thread insert to the thread bore and to screw it in there. A rotation of the used engine is for example transmitted by means of a gear drive. This gear drive rotates a hollow cylindrically configured mandrel as is described in DE 600 08 330 T2. A thread connection between the mandrel and a sleeve with inner thread converts the rotation of the engine into a straight-lined installation movement of the mandrel into the thread bore. A punch is arranged in the hollow-cylindrically configured mandrel which is operated by a pneumatic cylinder. The pneumatic cylinder in combination with this punch only serves for breaking the installation tang present at the wire thread insert once the installation has been completed. After breaking the tang, the mandrel is rotatably removed again from the thread bore with installed wire thread insert in accordance with the rotating installation of the wire thread insert.

WO 2012/062604 describes a wire thread insert having a dragging tang projecting radially arch-like into the helix. In contrast to the above-described wire thread insert, the arch-like configured dragging tang is bent back into the inner thread of the component opening after completion of the installation. This tang that is redressable/can be bent back remains in the inner thread of the component opening after completion of the installation, so that, for example, disturbing waste is avoided during the installation process.

A corresponding tool for the installation of the wire thread insert with redressable tang is described in WO 2012/062604 A1 which has already been mentioned above. An alternative configuration of such a tool is described in WO 2018/114122. These installation tools are characterized in that the wire thread insert is initially rotated or screwed onto a hollow cylindrically configured installation spindle. Due to suitable engagement shoulders and projections, the axial front face of the installation blade, which is arranged at the front seen in installation direction, ensures that the installation tool can grip the redressable tang and rotate it in. An actuator is arranged inside of the hollow cylindrical installation spindle, which specifically moves out an installation blade by means of a linear movement. This installation blade forms a compression face, which is moved out of the installation spindle, for the compressive redressing of the installation tang into the receiving thread of the component opening. After completing the redressing of the dragging tang, the actuator and thus the compression blade are again pulled in the installation spindle in order to be able to rotate the installation spindle out of the wire thread insert afterwards.

A further developed tool for installing a wire thread insert with redressable tang is described in WO 2019/141497. The installation tool is driven by a rotating drive unit, in this case an electric engine. The electric engine transmits its rotation and its torque to the installation spindle with the help of a torque coupling. Due to its construction, the torque coupling causes a linear movement of the actuator that is arranged within the hollow cylindrical installation spindle when reaching a specific torque threshold. This linear movement of the actuator, which is caused merely mechanically, within the installation spindle causes an installation blade to be moved out for redressing the tang or the installation blade to be drawn into the installation spindle.

In comparison with the state of the art, the present disclosure solves the problem of providing an automatic installation machine for and in combination with an installation tool for a wire thread insert, which conducts known installation processes in an optimized and more effective manner.

3. SUMMARY

The above object is solved by an automatic installation machine as well as by an installation method for a wire thread insert with the mentioned automatic installation machine. Advantageous configurations and further developments of the present disclosure result from the following description, the accompanying drawings as well as the appending claims.

The automatic installation machine is connectable to an installation tool for a wire thread insert so as to install the wire thread insert in a thread bore of a component. For this purpose, the automatic installation machine comprises the following features: a rotating drive unit providing a rotation movement that is switchable between a first and a second rotation direction, an axially displaceable hollow cylindrical setting spindle in rotation coupling with the rotating drive unit so that during a transmission of a rotation movement from the drive unit to the setting spindle, the setting spindle is displaceable in longitudinal direction independent of the rotation movement, a first actuating member, which may be a pneumatic cylinder with an axially movable piston, the effective direction of which is oriented parallel to the longitudinal direction of the setting spindle and which is offset-coupled or coupled with an offset with the setting spindle so that the setting spindle is axially displaceable by means of the actuating member, an axially displaceable actuating mandrel that is arranged within the hollow cylindrical setting spindle and which is driven or actuatable generally rotation-free, and a tool chuck via which the installation tool for a wire thread insert is connectable with the setting spindle.

With the help of the present disclosure, the constructive requirement for an automatic installation of wire thread inserts in thread bores of a component is provided. Thus, such an automatic installation machine constitutes a further degree of automatization compared with known manual tools for installing a wire thread insert in a thread bore. The automatic installation machine may be configured in a way that it is connectable with installation tools of different configuration and/or functionality. Thus, the automatic installation machine provides the basis for operating the respective kind of installation tool for the used wire thread insert, because known installation tools are adapted to a wire thread insert with installation tang or a wire thread insert without installation tang or to a wire thread insert with a curved installation tang projecting radially to the inside.

The automatic installation machine may provide, with the help of a rotating drive unit, which may be an electric engine or a servo engine, the rotating movement of the setting spindle. This rotating movement of the setting spindle is transmitted to an installation spindle of the installation tool to rotate the wire thread insert onto the installation spindle, to screw it into the thread bore and after that, to screw the installation spindle out of the installed wire thread insert.

In order to simplify the delivery of the setting spindle and thus of the installation spindle with wire thread insert to the thread bore in the component, a first actuating member, which may be a first pneumatic cylinder with an axially movable piston, may be used. Electromagnetic, piezoelectric, hydraulic, and pneumatic actuating members may be the first actuating member. The function of the first actuating member is explained by using the example of a pneumatic cylinder. The effect of the pneumatic cylinder is oriented parallel to the axial extension of the setting spindle and thus of the installation spindle. Furthermore, the pneumatic cylinder is integrated in the automatic installation machine such that via its axially movable piston, the setting spindle is displaceable or moveable parallel to the effective direction of the pneumatic cylinder. While by that, the installation process of the wire thread insert is realized by the rotation of the rotating drive unit, the first pneumatic cylinder is responsible for delivering the setting spindle in the direction of the thread bore as well as for placing it back from the thread bore. This reduces the effort in terms of adjustment compared to existing systems in which the delivery to the thread bore is realized for example via a thread connection of the setting spindle and a corresponding nut thread, because in this case, the rotating drive unit would not only be responsible for the installation of the wire thread insert but would also have to rotate the corresponding nut thread for the axial displacement, i.e. for delivering and removing the setting spindle from the thread bore in the component.

The functional separation of the delivery and the rotating installation is guaranteed by the fact that the rotating drive unit is only capable of transmitting a torque to the setting spindle. The torque may be transmitted with the help of a torque ball bushing or a groove shaft guide, within which the setting spindle is retained in an axially movable manner by means of a form-fit connection.

At the end of the setting spindle, facing away from the rotating drive unit, a tool chuck is provided via which the installation tool for the wire thread insert is connectable with the setting spindle. Such tool chucks may be configured differently, such as for example a collet chuck or a ball locking. These known mechanical coupling constructions are intended to transmit axial movements of the setting spindle construction to the installation tool, too, beside a torque.

Based on the hollow cylindrical construction of the setting spindle, an actuating mandrel is arranged within the setting spindle. This actuating mandrel is displaceable in a specific manner in longitudinal direction of the setting spindle to realize different functionalities of known installation tools. This axial displacement of the actuating mandrel may be transmitted to an installation spindle that is also constructed hollow cylindrically, which contains at least an inner actuating member or another inner movable element. With the axial movement of the actuating mandrel, which is driven rotation free in the setting spindle, which may be an installation blade of the installation tool or a mandrel for breaking off the tang of the wire thread insert or something similar is actuated or moved, respectively. In this context, the axial movement that may be carried out by the actuating mandrel within the setting spindle is not caused by the rotating drive unit. The same applies to the first pneumatic cylinder, i.e. the first actuating member, which may be configured such that it only moves the setting spindle in its longitudinal direction in a delivering or a pulling-back manner.

With respect to the above-mentioned tool chuck, the installation spindle may be receivable as an installation tool in a hexagon socket as a tool chuck. By that, a torque-proof connection is realized. An adjustment mandrel inside of the installation spindle couples to the actuating mandrel via a central ball locking.

According to a configuration of the automatic installation machine, the rotatable setting spindle and the first actuating member, which may be a piston of the first pneumatic cylinder, are connected with each other via a rotation-decoupling connecting unit so that the setting spindle is linearly displaceable by the first pneumatic cylinder or generally the first actuating member while being rotated by the rotating drive unit at the same time.

The rotation decoupling connecting unit may guarantee that the rotating drive unit can transmit its torque and the first pneumatic cylinder can transmit its linear movement to the setting spindle independently from one another. These movements may be controllable and realizable independently from one another, so that a use of the two movements at the same time may lead to a reduction of cycle times, e.g. during the installation of a wire thread insert in a component opening.

According to a further configuration, the rotation decoupling connecting unit comprises a second, which may be an integrated, actuating member between the setting spindle and the first actuating member, with which the actuating mandrel is linearly displaceable within the setting spindle.

That means that torques of the rotating drive unit and a linear movement of the first actuating member, which may be the first pneumatic cylinder, may be transmittable to the setting spindle, the second actuating member that is arranged in the rotation decoupling connecting unit provides for a control, which is decoupled from the further functions and movements, of the actuating mandrel in the setting spindle. The reason for that is that the linear movement that is caused by the second actuating member within the rotation-decoupling connecting unit is controllable and executable independent of the rotation movement of the rotating drive unit and a linear movement of the first pneumatic cylinder. Consequently, it is not only the rotating movement of the drive unit and the linear movement of the first pneumatic cylinder that can be combined with one another and/or overlapped in an effective manner. Rather, the linear movement of the actuating mandrel may be controlled and may take place within the hollow cylindrical setting spindle at least partly parallel to the rotating movement of the drive unit and/or to the linear displacing movement of the first pneumatic cylinder.

According to different embodiments of the present disclosure, the second actuating member may be an electromagnetic actuating member or a piezoelectric actuating member or a pneumatic actuating member.

The rotation decoupling connecting unit may provide an installation space beside the rotation decoupling connection between the piston of the first pneumatic cylinder and the rotatably used setting spindle, with the installation space being usable with different functional components. What is essential for these functional components is, however, that they are capable of changing the axial position of the actuating mandrel within the setting spindle by means of a generated movement.

According to a configuration, an electromagnetic actuating member or a piezoelectric actuating member may be integrated in the installation space of the connecting unit. They may be controlled electrically in the known manner and change length based on the delivered electric signal. This change of length is directly or indirectly transmitted to the actuating mandrel within the setting spindle, so that the actuating mandrel changes its axial position within the inner channel of the setting spindle due to the movement of the actuating member. Accordingly, it may be an electric signal which causes a movement of the piezoelectric or electromagnetic actuating member so that the actuating mandrel moves out in the direction of an installation direction. This movement may be transmitted to the installation tool in order to break an installation tang of a wire thread insert or to move out an installation blade in the installation tool in order to prepare the redressing/bending back of a redressable tang/a tang that can be bent back of a wire thread insert. In the same way, an electric signal causes a shortening of the actuating member or an axial movement of the actuating mandrel and accordingly of a mandrel in the installation tool, so that the same is pulled back into an installation spindle.

According to a further configuration, the installation space that is present in the rotation decoupling connecting unit is implemented as a pneumatic cylinder in which a piston for providing a second actuating member, which may be a second pneumatic cylinder, is movably arranged. This provides the possibility that the air supply which is available for the first pneumatic cylinder having its own valve technology may also be used for operating a second pneumatic cylinder that is arranged in the rotation decoupling connecting unit. Furthermore, the advantage of a second pneumatic cylinder is that no electric delivery lines to the rotation decoupling connecting unit are necessary. The second pneumatic cylinder is supplied with the help of suitable pneumatic ports so that an axial movement in installation direction of the wire thread insert or opposite to an installation direction is specifically controllable.

According to a further configuration, the pneumatic actuating member within the rotation decoupling connecting unit may be a double-acting pneumatic cylinder or a single-acting pneumatic cylinder with spring reset.

The use of a second pneumatic cylinder in a parallel operation to the first pneumatic cylinders as an actuating member for the actuating mandrel within the setting spindle can be achieved according to a first configuration of the present disclosure with the help of a single-acting pneumatic cylinder with spring reset. This means that with the help of the activatable air pressure, the pneumatic cylinder is specifically movable in one direction, only. In this context, a configuration of the single-acting pneumatic cylinder, which generates a movement in the installation direction due to an applied control pressure, is useful. This movement may be carried out with a force according to the amount of the applied air pressure. A potential use is (see above) to break a tang of the wire thread insert in this way with the help of the actuating mandrel. A further possibility is to move out an installation blade of the installation tool. As soon as the actuating mandrel is intended to return into its initial position, the acting pressure on the second pneumatic cylinder, in this case carried out as a single-acting pneumatic cylinder, is switched off. As the piston of the second pneumatic cylinder may be arranged in a spring-preloaded manner in the opposite direction of the acting pressurized air, the acting spring preload causes a movement of the piston into its initial position, i.e. opposite to the installation direction, when the air pressure is switched off. This configuration of the actuating member may lead to an effective deflection of the actuating mandrel and of the components of the installation tool connected to it. At the same time, it is also guaranteed that the actuating member is led back into its initial position with the help of the acting spring preload without any big effort in terms of switching and controlling.

According to a further configuration, the second pneumatic cylinder is configured as a double-acting pneumatic cylinder in its parallel arrangement to the first pneumatic cylinder. Double-acting pneumatic cylinder means in this context that a first acting air pressure is used for the adjustment of the actuating member in installation direction, while a second acting air pressure moves back the actuating member or piston of the second pneumatic cylinder into its initial position. Compared to the above-described spring reset of the single-acting pneumatic cylinder, a pneumatic control pressure may therefore be necessary which on the one hand controls the movement in installation direction and on the other hand, causes the movement opposite to the installation direction.

A second pneumatic cylinder may be used as the actuating member in the rotation-decoupling connecting unit, it may be necessary that there is a pneumatically sealed connection between the setting spindle and the connecting unit or its receiving space, respectively. In this case, the rotation decoupling connecting unit is constructed like a pneumatic rotary transmission, because the air that is necessary for controlling the second pneumatic cylinder is led through the connecting component. Furthermore, a decoupling takes place between the piston of the first pneumatic cylinder and the rotating setting spindle for the purpose of the rotation movement of the setting spindle.

According to a further configuration, the tool chuck for connecting with an installation tool for the wire thread insert is realized as a ball lock or as a collet chuck for an installation spindle of the installation tool.

A ball lock as well as a collet chuck are known mechanical constructions. On the one hand, they establish a releasable connection to an installation spindle of the installation tool. Furthermore, the ball lock as well as the collet chuck are combinable with a suitable form fit so that the rotation of the setting spindle is transmittable onto the installation spindle of the installation tool, too. In this context, beside the installation spindle, an adjustment mandrel, which may be for example guided in the installation spindle and which has a ball lock or a collet chuck, be connected with the automatic installation machine.

According to a further configuration, the automatic installation machine comprises an installation tool as is described in WO 2018/114122 A1. In WO 2018/114122 A1, an installation tool for a wire thread insert with redressable tang is described. A linearly movable actuating member is arranged in a spindle body, with which a dragging blade and/or compression blade may be moved out of the spindle body and may be pulled into it. By reference to WO 2018/114122 A1, the installation tool is incorporated herein in its entirety.

In addition, the present disclosure also includes an installation method for a wire thread insert in a thread bore of a component with an automatic installation machine, which may be an automatic installation machine according to one of the above embodiments, which comprises the following steps: screwing a wire thread insert onto an installation spindle of an installation tool that is connected with a setting spindle, in which a rotating drive unit rotates the setting spindle, delivering the installation spindle with the screwed-on wire thread insert to the thread bore with a first actuating member, which may be a first pneumatic cylinder, which displaces the setting spindle in the longitudinal direction, rotating the setting spindle in a first rotation direction in order to screw the wire thread insert into the thread bore, moving out an actuating mandrel that is arranged within the setting spindle by means of a second actuating member which is arranged in a rotation decoupling connecting unit between the setting spindle and the first actuating member in order to process a tang of the wire thread insert, rotating the setting spindle in a second rotation direction in order to unscrew the installation spindle from the thread bore.

The installation method for the wire thread insert is based on an effective organization of different installation movements. These installation movements may be realized partly at the same time, as the three drive units may be used for the installation of the wire thread insert in the thread bore of the component, because while the first actuating member, which may be the first pneumatic cylinder, implements an effective delivery of the setting spindle to the thread bore of the component, the rotating drive unit is solely responsible for rotating off and rotating in the wire thread insert in the thread bore. The advantage of this separation is already that the rotating movement of the drive unit does not have to realize a straight-lined delivery movement of the setting spindle to the thread bore with an adapted thread connection between the setting spindle and a rotating component of the drive unit. Furthermore, the actuating member of the rotation decoupling connecting unit may guarantee a smooth transition between a movement of rotating in the setting spindle and a subsequent actuating step for the actuating mandrel within the setting spindle, because with the help of the effective moving out of the actuating mandrel in installation direction, an installation blade may for example be positioned more effectively in terms of time or an installation tang may be broken directly after being rotated in. That means that the combination of two independently acting actuating members, which may be pneumatic cylinders, which also cooperate with different components of the automatic installation machine, guarantee an effective operation of the installation method. This effectiveness is additionally supported by the fact that the second actuating member which operates independently of the first actuating member may assume further installation steps with the installation tool.

According to a configuration of the installation method, the rotation decoupling connecting unit comprises a single-acting pneumatic cylinder with spring reset or a double-acting pneumatic cylinder as second actuating member, and the installation method may comprise the further step: adding a pneumatic pressure to the single-acting pneumatic cylinder or to the double-acting pneumatic cylinder whereby the actuating mandrel in the setting spindle is moved out from an initial position, and switching off the pneumatic pressure in the single-acting pneumatic cylinder and spring-resetting the actuating mandrel into the initial position or switching off the pneumatic pressure in a first chamber of the double-acting pneumatic cylinder and adding a pneumatic pressure in a second chamber of the double-acting pneumatic cylinder, thereby moving back the actuating mandrel into the initial position.

As an alternative to using a pneumatic second actuating member in the form of a single or a double-acting pneumatic cylinder, the rotation decoupling connecting unit comprises a piezoelectric or electromagnetic second actuating member as the actuating member. In this context, the installation method may include the following step: forwarding an electrical signal to the electromagnetic actuating member whereby the actuating member is activated and the actuating mandrel is moved out in the setting spindle from an initial position, and switching off the electrical signal to the second actuating member whereby the second actuating member is moved back and drags along the actuating mandrel in the initial position or whereby the second actuating member and the actuating mandrel are spring reset.

4. BRIEF DESCRIPTION OF THE DRAWINGS

Figure 2:
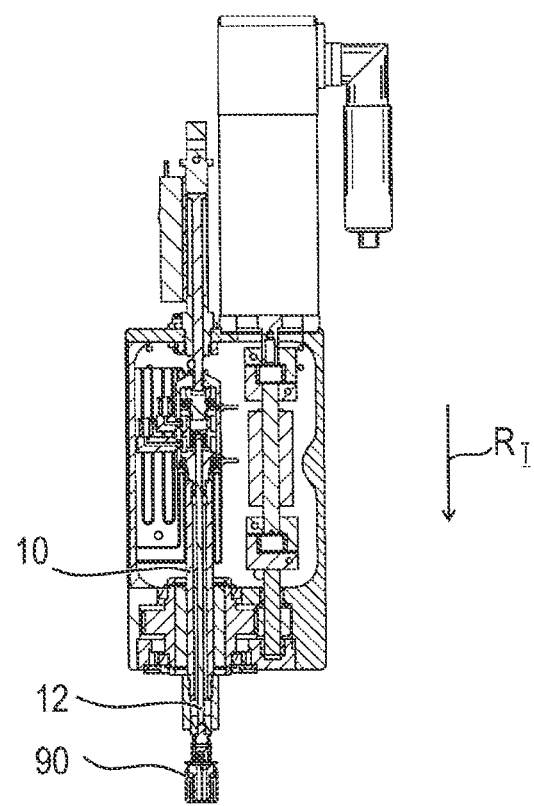
Figure 2:
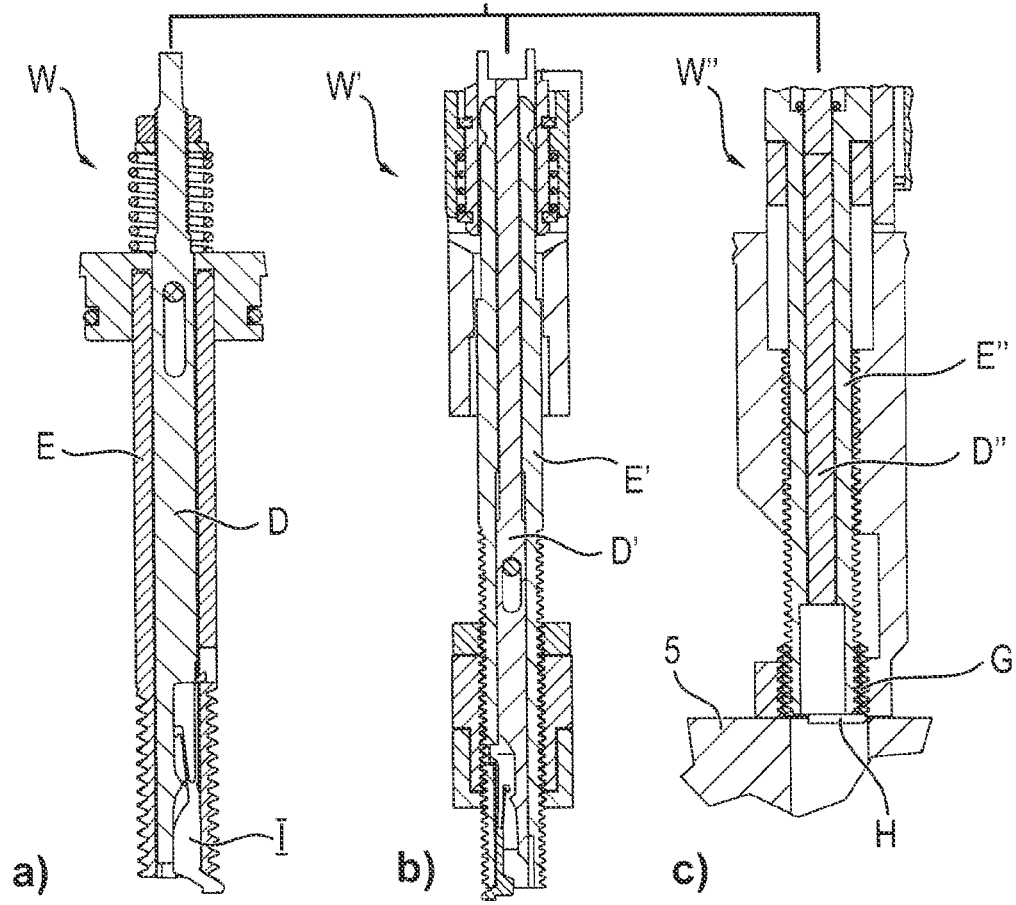
Figure 3:
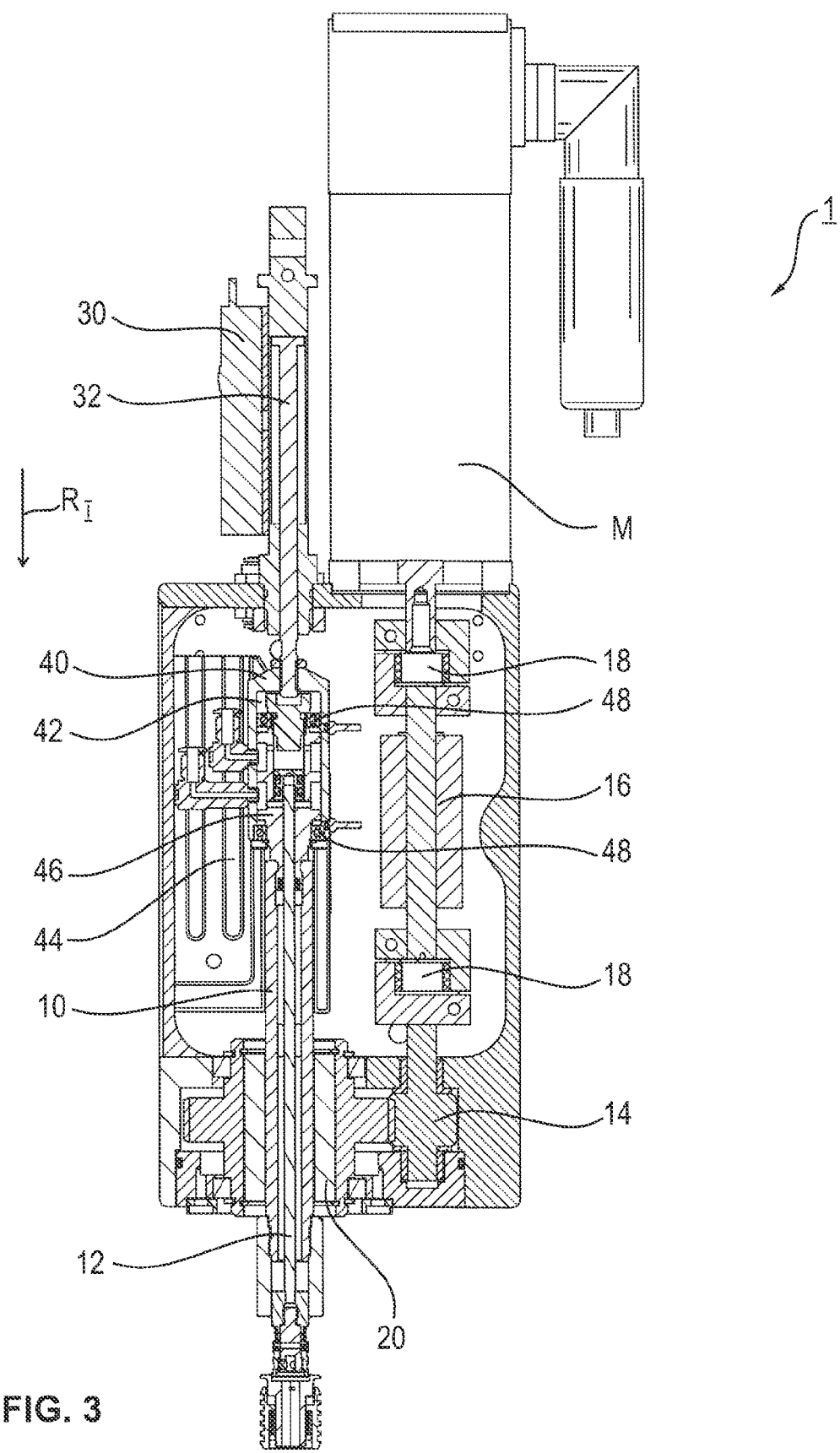
Figure 4:
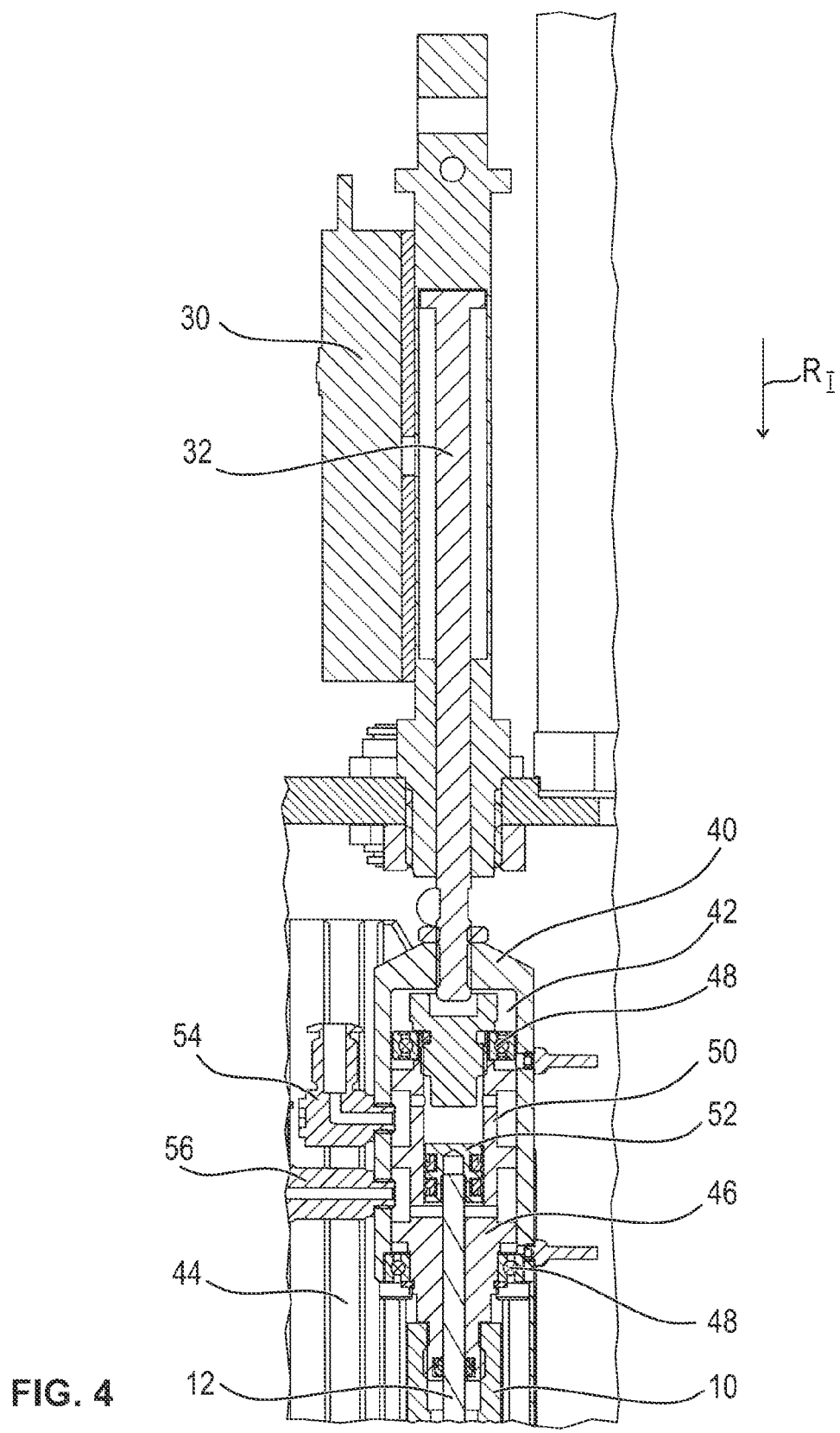
Figure 5:
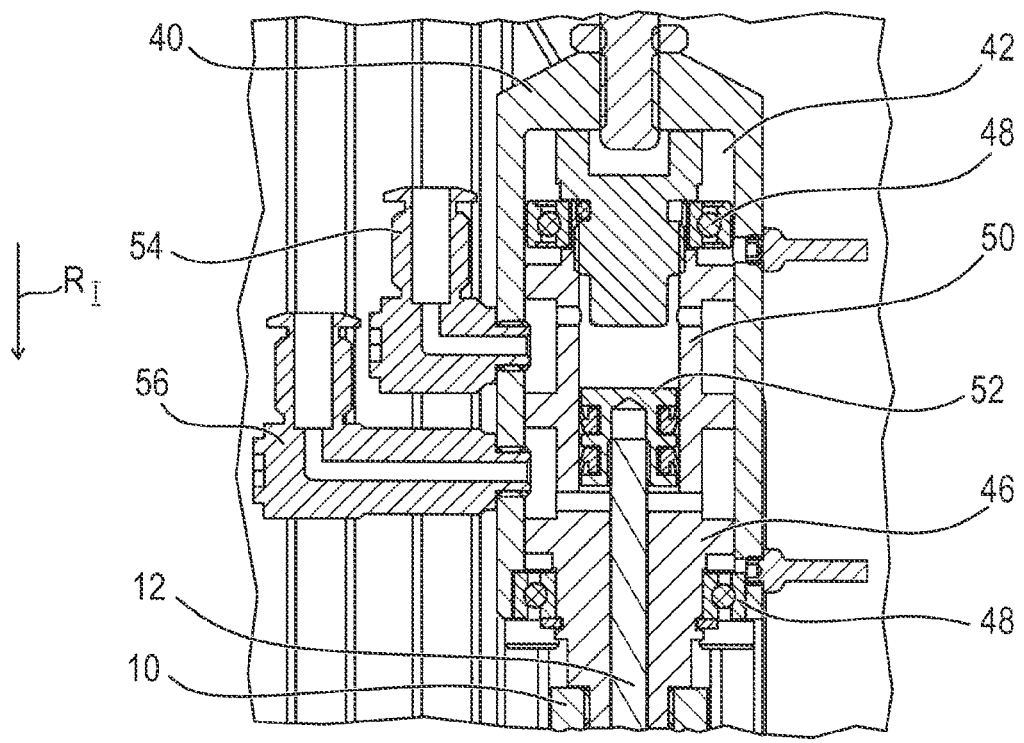
Figure 6:
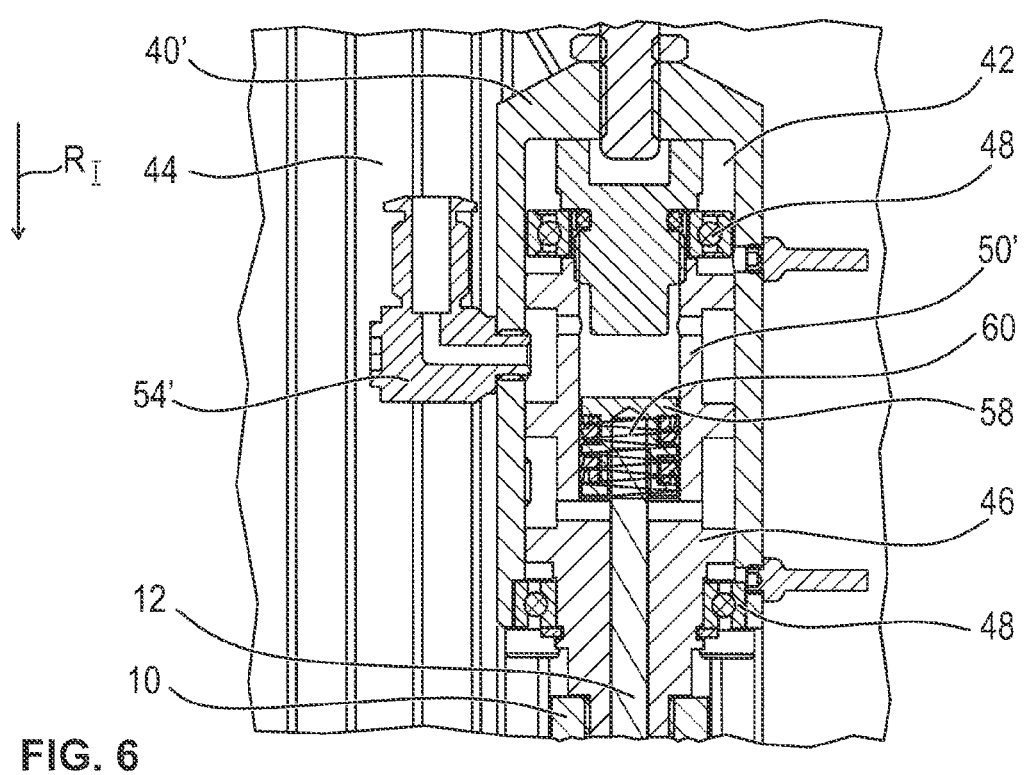
Figure 7:
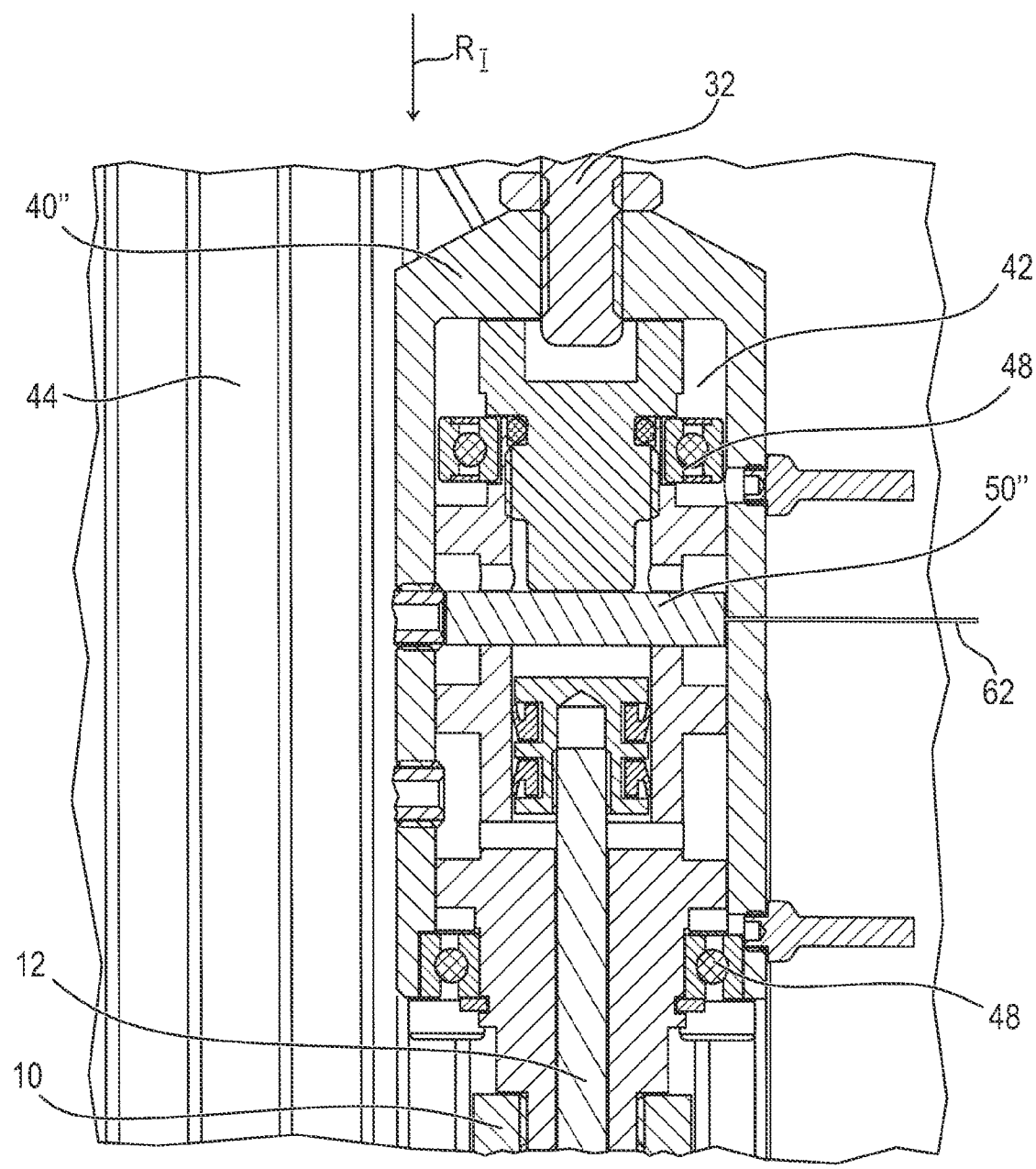
Figure 8:
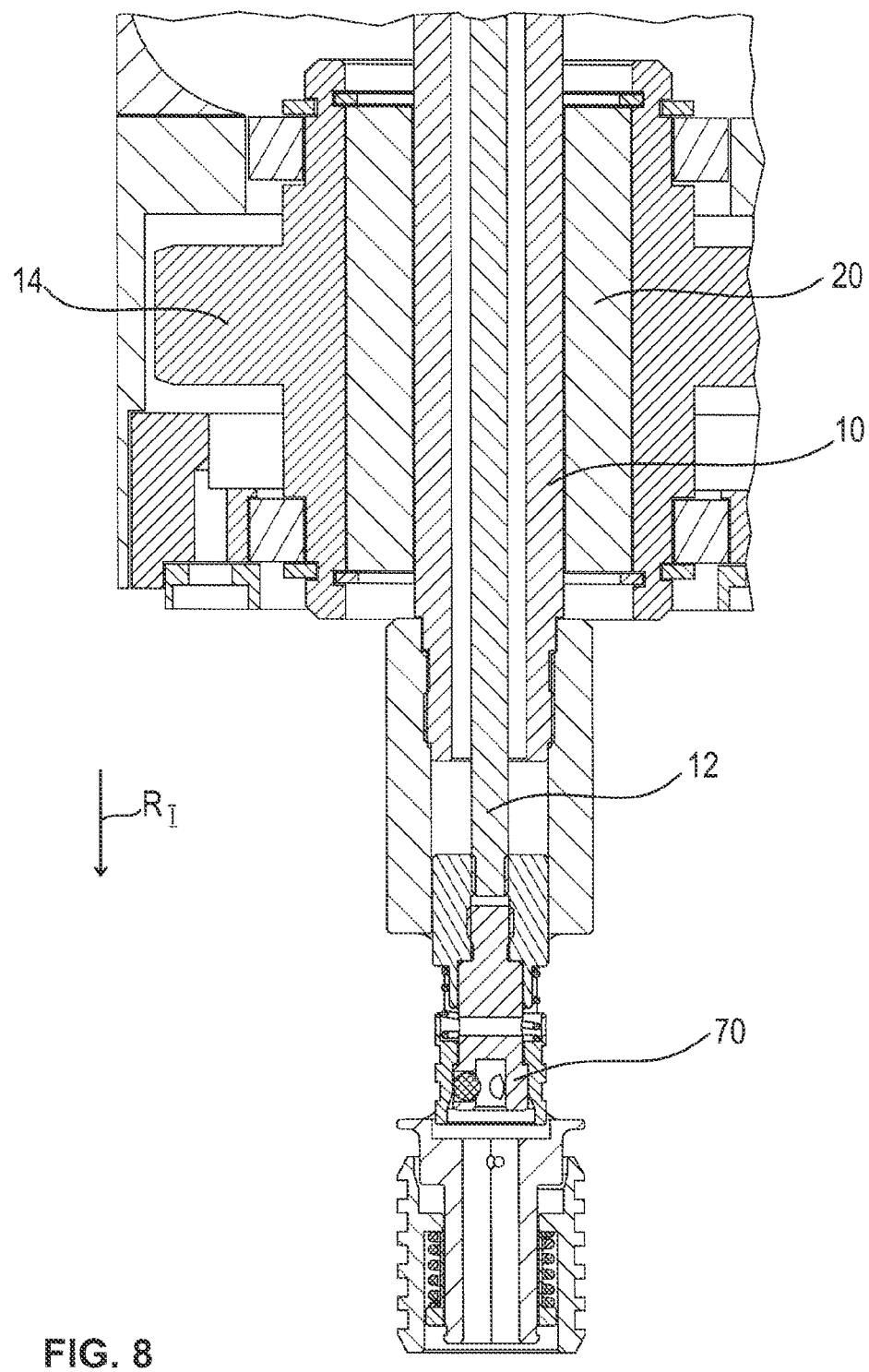
Figure 9:
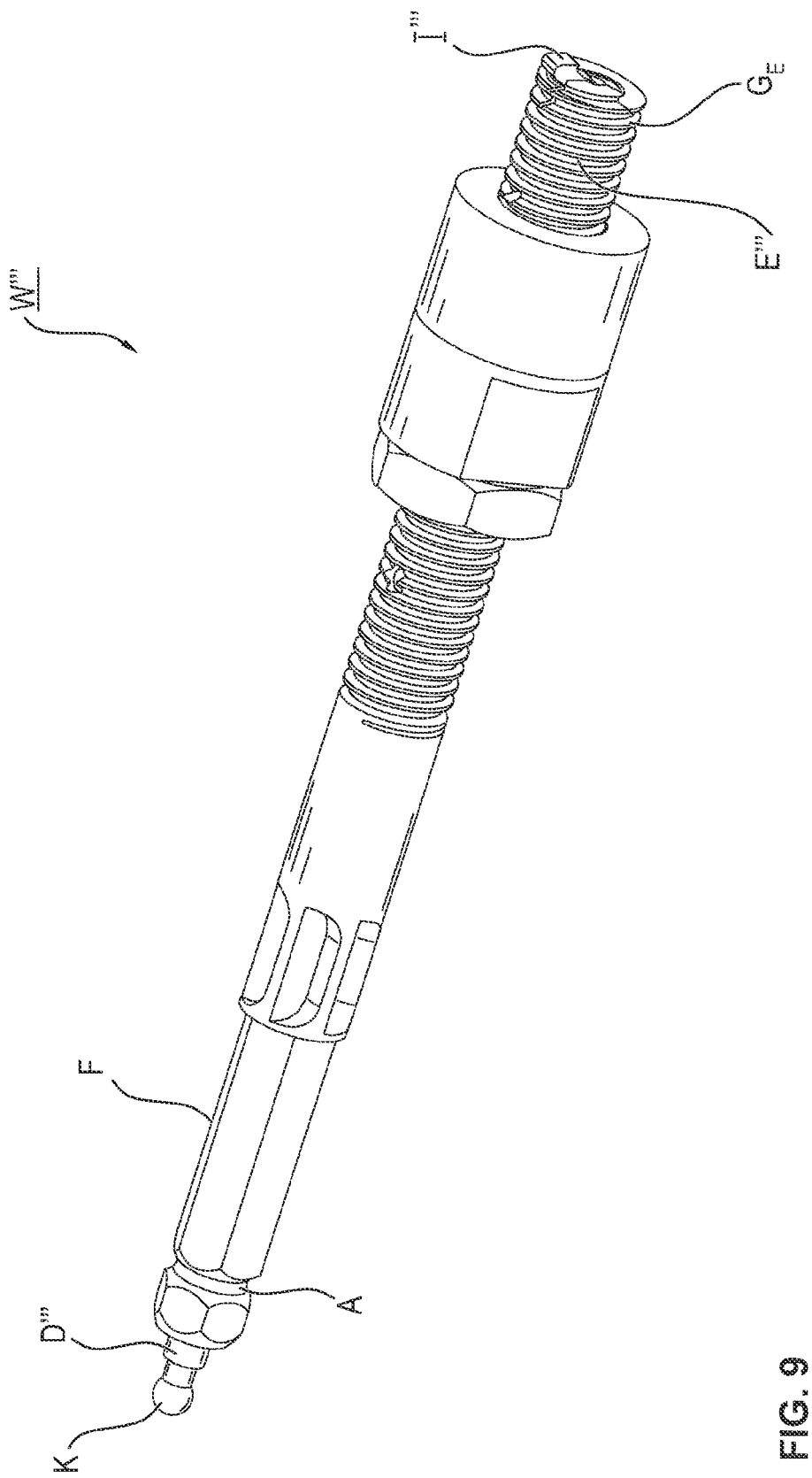
Figure 10:
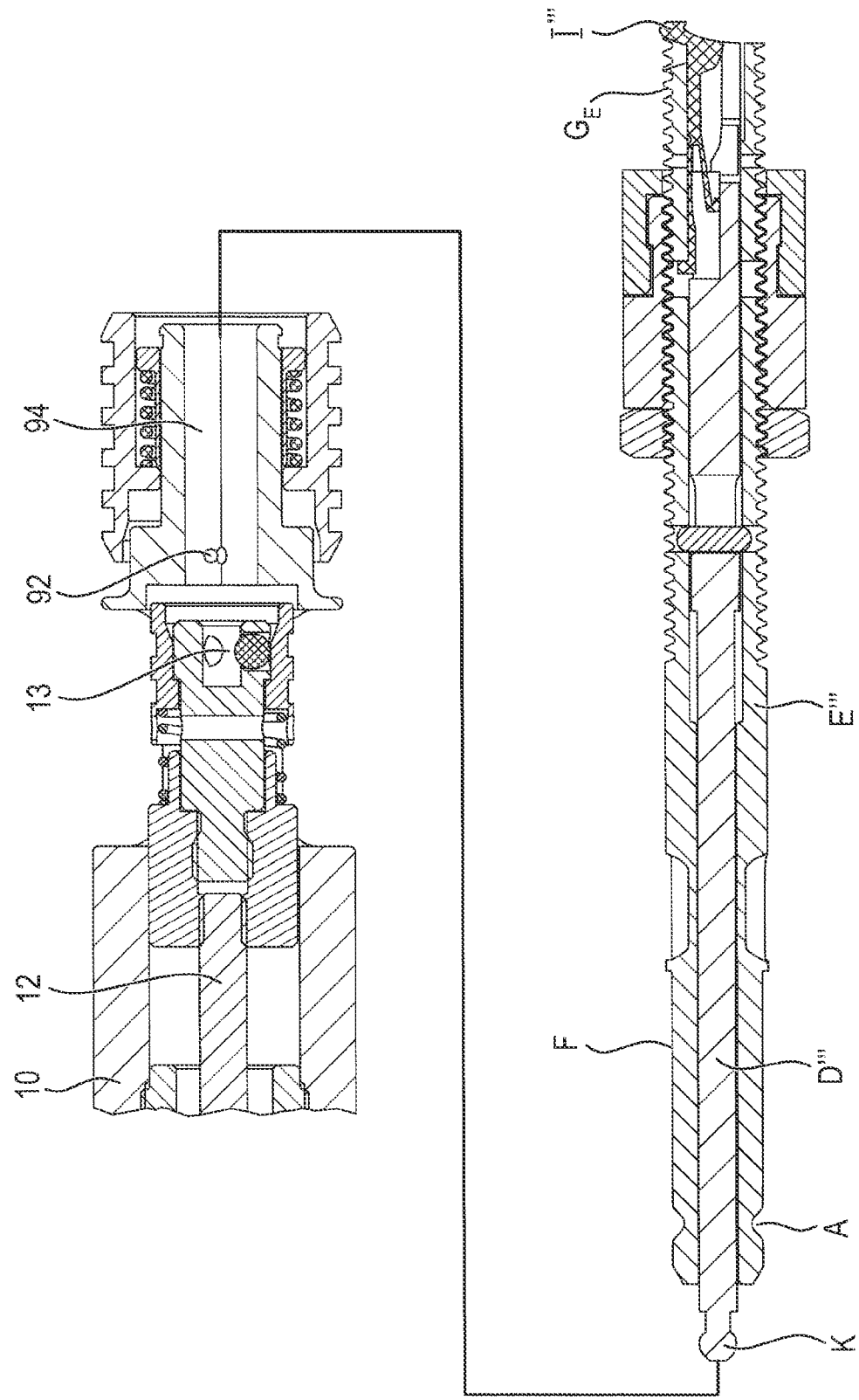
Figure 11:
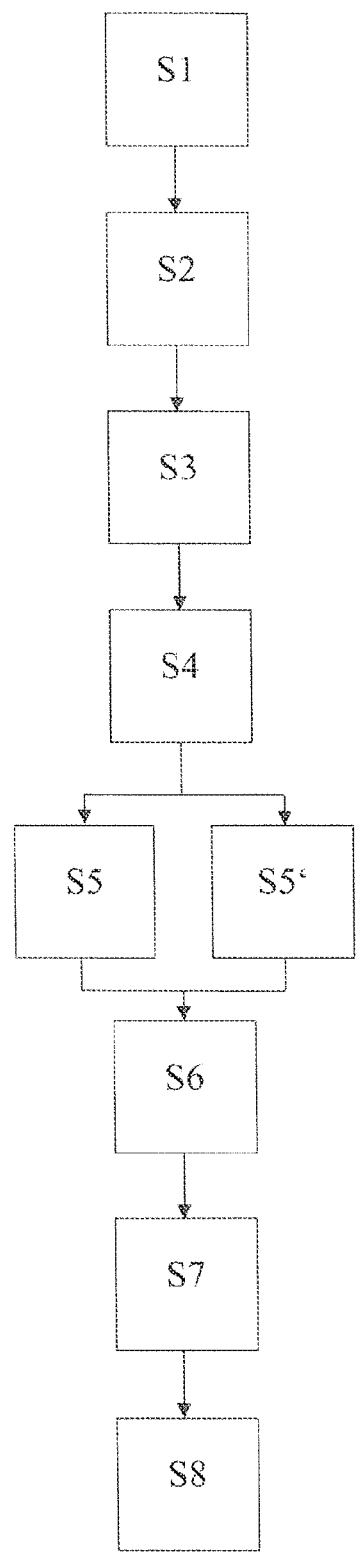

The embodiments of the present disclosure will be described in more detail based on the accompanying drawings, showing:

FIG. 1 an embodiment of an automatic installation machine that is arranged in a machine frame and is controlled automatically, for the installation of wire thread inserts in a thread bore of a component, FIG. 2 an enlarged illustration of the automatic installation machine according to FIG. 1, which may be combined with different configurations of the installation tool for the wire thread insert, which are illustrated as alternative configurations next to each other, FIG. 3 an enlarged illustration of the automatic installation machine according to FIG. 1, FIG. 4 a sectional enlargement of the illustration in FIG. 3, which shows the first pneumatic cylinder in combination with the rotation decoupled connecting component, FIG. 5 a configuration of the rotation decoupled connecting unit with a double-acting pneumatic cylinder as the actuating member, FIG. 6 a configuration of the rotation decoupled connecting unit with a single-acting pneumatic cylinder as the actuating member, FIG. 7 an embodiment of the rotation decoupled connecting unit with an electromagnetic or piezoelectric inner actuating member, FIG. 8 an enlarged view of the setting spindle, guided in a ball bushing with the tool chuck, FIG. 9 a perspective view of an embodiment of an installation tool, FIG. 10 a sectional view of the tool chuck and the installation tool for illustrating the connection between automatic installation machine and installation tool, and FIG. 11 a flow chart of an embodiment of the installation method for a wire thread insert in a thread bore of a component with an automatic installation machine.

5. DETAILED DESCRIPTION

FIG. 1 shows an embodiment of the automatic installation machine 1. It is integrated in a delivery device Z with which the automatic installation machine 1 is movable specifically in all three spatial directions.

A schematic sectional view of the automatic installation machine 1 of FIG. 1 is shown in FIG. 2 in alternative configurations. The automatic installation machine 1 generally realizes a precise delivery, positioning, and drive of an installation tool W, which installs a wire thread insert in a bore of a component. This may be a thread bore configured as a passage bore or a blind bore hole.

The wire thread insert to be installed (not shown) is constructed according to different known constructions. The installation tool W, which is releasably connected via a tool chuck 90 with the automatic installation machine 1, is determined by the construction of the wire thread insert. The tool chuck 90 may be configured as a collet chuck or a ball locking. In addition, the tool chuck 90 establishes a torque proof connection between a setting spindle 10 of the automatic installation machine 1 and an installation spindle E; E'; E" of the installation tool W; W'; W". A rotation of the setting spindle 10 is transmitted to the installation spindle E; E'; E" via the torque proof connection.

At the same time, the tool chuck 90 realizes a connection between an actuating mandrel 12 arranged within the setting spindle 10 and an adjustment mandrel D; D'; D" in the installation spindle E; E'; E". The adjustment mandrel D; D'; D" is connected with the actuating mandrel 12, which may be via a ball locking. This provides the constructive basis for linearly moving the adjustment mandrel D; D'; D" together with the actuating mandrel 12 in an installation direction $R_I$ of a wire thread insert and opposite to it.

As with the automatic installation machine 1, a rotation movement of the setting spindle 10 as well as a linear movement of the actuating mandrel 12 are transmittable to the connected installation tool W; W'; W", the automatic installation machine 1 is connectable with an installation tool W; W'; W" of different constructions. According to an embodiment (see FIG. 2a), the automatic installation machine 1 is connected with an installation tool W, as is described in WO 2018/114122 A1. The adjustment mandrel D is arranged within the installation spindle E. An installation blade I can be moved out of the installation spindle and can be drawn back into the installation spindle E by means of the linear movement of the adjustment mandrel D. By reference, the construction of the installation tool W is completely incorporated into the present application.

A further construction of the automatic installation machine 1 and of an installation tool W' is shown in FIG. 2b. The illustrated installation tool W' in combination with a drive unit is described in WO 2019/141497. The disclosed installation spindle E' with adjustment mandrel D' but without drive unit may be combined with the automatic installation machine 1. Accordingly, the installation tool W' of WO 2019/141497 without drive unit is incorporated by reference.

The installation tools W and W' may be suitable for installing a wire thread insert with redressable tang according to EP 2 637 825 B1.

FIG. 2c shows an installation tool W" according to EP 1 084 800 B1 out of an installation spindle E" and an adjustment mandrel D". While the installation spindle E" is rotated by means of the setting spindle 10, the adjustment mandrel D" may be displaced with the help of the actuating mandrel 12 linearly in installation direction $R_I$ and back. The movement of the actuating mandrel 12 and thus of the adjustment mandrel D" is used for breaking a radially inwardly projecting installation tang Z when installing a wire thread insert G comprising same. The construction of the installation tool W" is incorporated in its entirety by reference to EP 1 084 800 B1.

An enlarged illustration of the automatic installation machine 1 of FIGS. 1 and 2 is shown in FIG. 3 in a schematic sectional view. A drive unit M in the form of an engine, which may be an electric engine such as a three-phase synchronous engine, causes the rotation of the setting spindle 10. For supporting the operation of the automatic installation machine 1, the position of the three-phase synchronous engine M may be monitored according to one configuration. That means that the respective position of the three-phase synchronous engine is detected and transmitted to a control unit.

A rotation of the engine M in a first and an opposite second rotation direction is transmitted to the setting spindle 10 via a gear 14, which may be a reduction gearing.

For detecting a torque that is generated by the engine M, a torque sensor 16 may be arranged in front of the reduction gearing 14. The detected torque may be also transmitted to the control unit S and is monitored there.

In order to dampen the torque that is generated by the engine M, the torque sensor 16 may be framed by two claw couplings 18. They prevent an excessive stress of the gear 14 due to torque peaks caused by the engine M.

In order to transmit the rotation movement and the torque of the engine M to the setting spindle 10, the reduction gearing 14 may be connected with the setting spindle 10 via a ball bushing 20. The ball bushing 20 of the well-known construction is connected form-fit with the setting spindle 10. By that, the setting spindle 10 is linearly displaceable within the ball bushing 20 in installation direction $R_I$ or in longitudinal direction of the setting spindle 10. A further form fit connection between the reduction gearing 14 and the ball bushing 20 may ensure that the rotation movement and the torque of the engine M may be transmitted to the setting spindle 10. Based on this construction, also a linear displacement of the setting spindle 10 within the ball bushing 20 in installation direction $R_I$ and opposite to it may be implemented when rotating the setting spindle 10.

For linearly moving the setting spindle 10 in or opposite to the installation direction $R_I$, a first actuating member, here, which may be a first pneumatic cylinder 30, is provided. The first pneumatic cylinder 30 comprises a piston 32. The piston 32 of the first pneumatic cylinder 30 may be specifically movable as a double-acting cylinder in two directions parallel to the installation direction $R_I$. The first pneumatic cylinder 30 may be provided as a single-acting pneumatic cylinder with spring reset opposite to the installation direction $R_I$ (not shown).

As the first pneumatic cylinder 30 acts as a linear actuating member, it may be implemented as an electromagnetic or electric or piezoelectric actuating member according to further configurations.

The linear deviation of the piston 32 of the first pneumatic cylinder 30 displaces the setting spindle 10 in installation direction $R_I$ or opposite to it. In this way, the first pneumatic cylinder 30 may deliver the setting spindle 10 and thus the associated installation tool W; W'; W" to a thread bore in a component by means of a non-rotating straight movement. The actuating mandrel 12 is also carried along with the setting spindle 10, which is arranged within the setting spindle 10.

Only when the rotating-in of a wire thread insert, which is arranged in the installation spindle E; E'; E", into the thread opening has started, does the engine M move the setting spindle 10 and thus the installation spindle E; E'; E" into rotation via the reduction gearing 14. The screwing-in or rotating-in of the wire thread insert in the thread bore may be implemented by the rotation of the setting spindle 10, alone. In doing so, an inner thread of the thread bore of the component draws the wire thread insert with installation spindle E; E'; E" into the thread bore due to the rotation of the setting spindle 10. At this point in time, the first pneumatic cylinder 30 may be unpressurized. The rotating-in of the wire thread insert in the thread bore be supported with a power-assisted displacing movement of the first pneumatic cylinder 30 or the first actuating member in installation direction $R_I$.

The pneumatic cylinder 30 may be adjustable by means of a pressure reducer in terms of a maximum force. The first pneumatic cylinder 30 comprises a position sensor. It senses the absolute displacement of the piston 32 which may be calibrated to the displacement of the installation spindle 10 and an installation depth of a wire thread insert Z in a component opening. As additionally, the installation spindle 10 may displace the piston 32 of the first pneumatic cylinder also in installation direction $R_I$ when rotating the wire thread insert into a thread bore, it may be determined with the help of the position sensor how deep the wire thread insert has been set into the thread bore.

The setting spindle 10, which is arranged linearly movably by and along with the piston 32 of the first pneumatic cylinder 30, is connected with the piston 32 or generally with the first pneumatic cylinder 30 via a rotation decoupling connecting unit 40. The rotation decoupling connecting unit 40 is connected with the piston 32. The linear movement of the piston 32 is transmitted to the connecting unit 40 and then to the setting spindle 10 via this connection.

The connecting unit 40 may define an inner receiving space 42. While the piston 32 is fastened to a first axial end of the connecting unit 40, the setting spindle 10 is connected with a second axial end that is opposite to the first axial end. The connecting unit 40 may be arranged in a non-rotating manner. For this purpose, it is guided in a link motion 44. This link motion 44 comprises at least one guiding slot extending parallel to the installation direction $R_I$ and retaining the connecting unit 40 against rotating.

The setting spindle 10 may be also connected with a rotation cylinder 46. The rotation cylinder 46 is arranged freely rotatably in the receiving space 42 and connects the connecting unit 40 with the setting spindle 10. For the support of the rotation of the rotation cylinder 46 in the connecting unit 40, grooved ball bearings 48 may be provided.

The actuating mandrel 12 inside of the setting spindle 10 is connected with an actuating member 50; 50'; 50" in the receiving space 42 of the connecting unit 40. An enlarged illustration of the connecting unit 40 with different actuating members 50; 50'; 50" is illustrated in FIGS. 5 to 7.

As described already further below, the installation tool W; W'; W" consists of at least one rotatable installation spindle E. The adjustment mandrel D which is displaceable or movable in a straight manner is arranged inside of the installation spindle E. It is used in accordance with the construction of the installation tool W; W'; W" for moving out or drawing in an installation blade I or for breaking a tang Z at the wire thread insert G. The linear actuation of the adjustment mandrel D is generated by the actuating mandrel 12. The rotation of the installation spindle E is generated by the setting spindle 10.

In order to be able to control and move the setting spindle 10 and the actuating mandrel 12 and thus the associated installation spindle E and the adjustment mandrel D separately, the rotation decoupling connecting unit 40 is provided. On the one hand, the rotation decoupling connecting unit 40 guarantees the rotation of the setting spindle 10 during a simultaneous linear movement with the help of the first pneumatic cylinder 30. Parallel to that, the actuating member 50; 50'; 50" in the rotation decoupling connecting unit 40 guarantees that the actuating mandrel 12 may be linearly displaced in or opposite to the installation direction $R_I$.

In the receiving space 42 of each of the connecting unit 40 and 40' of FIGS. 5 and 6, a second actuating member 50 and 50', which may be a pneumatic actuating member, is arranged.

The pneumatic actuating member 50 may consist of a double-acting second pneumatic cylinder. The double-acting second pneumatic cylinder 50 consists of a double-acting piston 52 which operates as a cylinder in the receiving space 42 of the connecting unit 40. The different sides of the double-acting piston 52 may be flown against in a specific manner via two compressed air connections 54, 56. When air pressure is applied to the compressed air connection 54, the double-acting piston 52 and the actuating mandrel 12 connected with it move in the installation direction $R_I$. When air pressure is applied to the compressed air connection 56, a reset of the double-acting piston 52 and thus of the actuating mandrel 12 opposite to the installation direction $R_I$ may be caused.

In FIG. 6, the pneumatic actuating member 50' may be implemented as a single-acting pneumatic cylinder 50' with spring reset. Compressed air is applied to the single-acting piston 58 via the compressed air connection 54'. This causes a displacement of the single-acting piston 58 together with the actuating mandrel 12 in installation direction $R_I$. For a reset of the single-acting piston 58, the air pressure at the compressed air connection 54' is reduced or switched off. A spring 60 that preloads the single-acting piston 58 may relax by that and return the piston 58 opposite to the installation direction $R_I$.

A further embodiment of the second actuating member 50" is shown in FIG. 7. An electromagnetic or piezoelectric actuating member 50" is arranged in the receiving space 42 of the connecting unit 40". This actuating member may be controlled via electric supply lines 62 or with the help of a wireless connection. The supply lines 62 are configured such that they do not hinder a movement of the connecting unit 40" or are not damaged by them. Depending on the electric activation, the actuating member 50" deviates in the installation direction $R_I$ in order to actuate the actuating mandrel 12. In case of an opposite electric activation, the actuating member 50" moves the actuating mandrel 12 opposite to the installation direction $R_I$ which may be in an initial position.

With respect to FIG. 8, the actuating mandrel 12 is connected with the actuating mandrel (not shown), which may be via a ball locking 70.

FIG. 9 shows an embodiment of the installation tool W'''. This installation tool W''' is explained in more detail and in other configurations in WO 2018/114122 A1, incorporated herein by reference.

The perspective illustration of the installation tool W''' in FIG. 9 shows the installation spindle E''' with outer thread $G_E$. A wire thread insert (not shown) is rotated on the outer thread $G_E$ in order to screw same into a thread bore of a component.

The installation spindle E''' includes a window in the axial front side that is arranged ahead of the installation direction $R_I$. The installation blade I''' is moved out of the installation spindle E''' and is drawn back into it through this window with the help of the actuating mandrel 12 and the adjustment mandrel D'''. When the installation blade I''' is located in the installation spindle E''', the wire thread insert is rotated on the installation spindle E''' and rotated into the component opening after that. This wire thread insert may be a wire thread insert with a redressable tang, which has been described already further above.

After reaching a desired installation depth of the wire thread insert in the component opening, the installation blade I''' is moved out of the installation spindle E''' by means of a movement of the actuating mandrel 12 and the adjustment mandrel D''' in installation direction $R_I$. This state is shown in FIG. 10.

The setting spindle 10 and thus the installation spindle E''' are now rotated contrary to the screw-in direction of the wire thread insert in the component opening. During this rotation movement, a lateral face of the installation blade I''' may engage a redressable tang of the screwed-in wire thread insert and bends, may compress, it into the receiving thread of the component opening. The redressable tang is not broken by that.

Once the tang has been redressed, the installation spindle E''' may be rotated by means of the setting spindle 10 by less than a quarter turn in screw-in direction of the wire thread insert. This releases the abutment between the installation blade I''' and the redressable tang. After that, the adjustment mandrel D''', controlled by the actuating mandrel 12, moves back the installation blade I''' into the installation spindle E'''. As soon as the installation blade I''' has been received again by the installation spindle E''', the installation spindle E''' is completely screwed out or rotated out of the installed wire thread insert.

The above-described installation method is described in more detail and with further configurations in WO 2018/114122 A1, too, which is hereby incorporated by reference.

In order to be able to reliably initiate the above-described steps of the installation tool E''' with the automatic installation machine 1, the tool chuck 90 may connect the automatic installation machine 1 in a force fit and form fit manner with the installation tool E'''. This is described in more detail by means of a configuration in FIG. 10. The actuating mandrel 12 may comprise a receiver 13 with ball lock. A ball head K of the adjustment mandrel D''' is releasably locked there. Based on this connection, the linear adjusting movements of the actuating mandrel 12 in the installation direction $R_I$ and opposite to it are transferred to the adjustment mandrel D'''.

The installation spindle E''' may comprise a form fit outer profile F in an axial end portion facing away from the thread end of the installation spindle E'''. The form fit outer profile F is configured non-rotation symmetrically, such as a square, a hexagon or the like.

The form fit outer profile F is received in a receiving space 94 that is configured complimentary to it. The form fit arising by that between the setting spindle 10 and the installation spindle E''' guarantees a transmission of the rotation movement of the setting spindle 10 to the installation spindle E'''.

In order to retain the installation spindle E''' in a releasable and firm manner in the receiver 94, a ball locking 92 may be provided in the tool chuck 90. The ball locking 92 engages or contacts a receiver A, which may be a groove, a recess, or a latching contour at the installation spindle E'''.

With the above-described connecting structures, the installation tool E''' may be reliably connectable with the automatic installation machine 1 and is displaceable in case of wear.

The setting of a wire thread insert is described based on the combination of the automatic installation machine 1 and the installation tool for a wire thread insert with redressable tang according to EP 2 637 825 B1. Such an installation tool W or W' is described in WO 2018/114122 A1 or in WO 2019/141497 (see above). A corresponding flow chart is shown in FIG. 11.

First, in a first step S1, the wire thread insert is rotated on the installation spindle E. For doing so, the engine M rotates the setting spindle 10 so that the installation spindle E screws itself into the wire thread insert or the wire thread insert is screwed on the installation spindle E.

Subsequently, in step S2, the tip of the installation spindle with wire thread insert rotated on it is positioned above the thread bore in the component. Subsequently, it may be the first pneumatic cylinder 30 which moves the installation spindle 10 and thus the wire thread insert in the installation direction $R_I$ in the direction of the thread opening. During the delivery in step S2, the setting spindle 10 may be rotated in the screw-in direction of the wire thread insert (step S3). This has the advantage that the wire thread insert may mesh the thread of the thread bore of the component during the delivery movement with the help of the rotation movement.

When reaching a defined relative position, which may be sensed by the position sensor of the first pneumatic cylinder 30, the rotation speed of the setting spindle 10 may be reduced. The reduction of the rotation frequency serves for being able to conclude or terminate the screwing process in a true-to-position like manner when a target installation depth of the wire thread insert has been reached (step S4).

For redressing the redressable tang of the wire thread insert into the component thread, the actuating mandrel 12 is moved in the installation direction $R_I$ by means of the actuating member 50; 50'; 50" in the connecting unit 40. The compression blade may be moved out of the installation spindle by means of the mandrel of the installation tool.

Once the compression blade has been moved out of the installation spindle by means of the actuating member 50; 50'; 50" and the mandrel, the engine rotates the setting spindle 10 opposite to the screw-in direction in a second rotation direction. In this way, the redressable tang may be redressed into the thread of the installation opening (step S5).

At this stage in the procedure in combination with the installation tool according to FIG. 2C, the tang Z may be broken with the help of the mandrel D". For this purpose, the movement of the actuating mandrel 12 is converted into a corresponding movement of the mandrel D" (step S5').

After the tang of the wire thread insert has been worked, the installation spindle is rotated opposite to the screw-in direction in step S6, in order to relieve the compression blade after redressing the redressable tang. After that, the actuating mandrel 12 is moved opposite to the installation direction $R_I$ or drawn into the setting spindle 10. This takes place via the corresponding movement of the actuating member 50; 50'; 50" (step S7).

After that, the setting spindle 10 is rotated opposite to the screw-in direction. In doing so, the installation spindle is rotated out from the thread bore (step S8).

Depending on the second actuating member used in the connecting unit 40, the following steps for actuating the actuating member may be carried out. First, a pneumatic pressure is added regarding the actuating member 50 having the double-acting pneumatic cylinder as well as regarding the actuating member 50' having the single-acting pneumatic cylinder. This pneumatic pressure causes the actuating mandrel 12 of the setting spindle 10 to be moved out of its initial position.

In order to be able to guide the actuating mandrel back into its initial position after termination of its actuating step, firstly, the pneumatic pressure in the actuating member 50' with single-acting pneumatic cylinder is switched off. By switching off the pneumatic pressure, the single-acting piston 58 is pneumatically released and the preloaded spring 60 causes a spring reset of the single-acting piston and the associated actuating mandrel 12.

In the actuating member 50 with double-acting pneumatic cylinder, the pneumatic pressure of a first chamber of the double-acting pneumatic cylinder is switched off first. Subsequently, the pneumatic pressure in the second chamber of the double-acting pneumatic cylinder is added. In this way, a moving back of the actuating mandrel 12 opposite to the installation direction $R_I$ which may be to its initial position takes place.

With the use of an electromagnetic or a piezoelectric actuating member 50", this actuating member may be controlled with the help of electric signals. If for example, at first, an electric signal is transmitted to the electromagnetic or the piezoelectric actuating member, the actuating member is actuated by that and the actuating mandrel 12 in the setting spindle 10 is moved out of its initial position in the direction of the installation direction $R_I$. Once the actuating mandrel has fulfilled its function, the electric signal to the electromagnetic actuating member or to the piezoelectric actuating member may be switched off. Accordingly, the electromagnetic actuating member may be moved back which causes the actuating mandrel to be carried along or carried back to the initial position. According to another configuration, the electromagnetic actuating member comprises a spring reset. After switching off the electric signal, the preloaded spring causes a reset of the electromagnetic actuating member together with the actuating mandrel to the corresponding initial position.

The invention claimed is:

1. An automatic installation machine which is connectable to an installation tool for a wire thread insert so as to install the wire thread insert in a thread bore, wherein the automatic installation machine-comprises the following features:
    a. a rotating drive unit providing a rotation movement that is switchable between a first and a second rotation direction,
    b. an axially displaceable hollow cylindrical setting spindle in rotation coupling with the rotating drive unit so that during a transmission of a rotation movement from the drive unit to the setting spindle, the setting spindle is displaceable in longitudinal direction independent of the rotation movement,
    c. a first actuating member, an effective direction of which is oriented parallel to the longitudinal direction of the setting spindle and which is coupled with an offset with the setting spindle so that the setting spindle is axially displaceable by the actuating member,
    d. an axially displaceable actuating mandrel that is arranged within the hollow cylindrical setting spindle and which is driven generally rotation-free, and
    e. a tool chuck via which the installation tool for a wire thread insert is connectable with the setting spindle.

2. The automatic installation machine according to claim 1, in which the rotatable setting spindle and the first actuating member are connected with each other via a rotation-decoupling connecting unit so that the setting spindle is linearly displaceable by the first actuating member while being rotated at the same time.

3. The automatic installation machine according to claim 2, in which the connecting unit comprises a second actuating member with which the actuating mandrel is linearly displaceable within the setting spindle.

4. The automatic installation machine according to claim 3, in which the first and/or the second actuating member are configured as a double-acting pneumatic cylinder or single-acting pneumatic cylinder with spring reset.

5. The automatic installation machine according to claim 1, in which the tool chuck is a ball lock or a collet chuck for an installation spindle of the installation tool.

6. The automatic installation machine according to claim 1, comprising an installation tool with an installation spindle, wherein an adjustment mandrel is linearly movable in the installation spindle, and the adjustment mandrel is capable of moving out an installation blade.

7. An installation method for a wire thread insert in a thread bore of a component with an installation machine according to claim 2, comprising the following steps:
    a. screwing a wire thread insert onto an installation spindle of an installation tool that is connected with a setting spindle, in which a rotating drive unit rotates the setting spindle,
    b. delivering the installation spindle with the screwed-on wire thread insert to the thread bore with a first actuating member which displaces the setting spindle in longitudinal direction,
    c. rotating the setting spindle in a first rotation direction in order to screw the wire thread insert into the thread bore,
    d. moving out an actuating mandrel that is arranged within the setting spindle by means of a second actuating member which is arranged in a rotation decoupling connecting unit between the setting spindle and the first actuating member in order to process a tang of the wire thread insert,
    e. rotating the setting spindle in a second rotation direction in order to unscrew the installation spindle from the thread bore.

8. The installation method according to claim 7, wherein the rotation decoupling connecting unit comprises a single-acting pneumatic cylinder with spring reset or a double-acting pneumatic cylinder as second actuating member and the installation method comprises the further step:
    adding a pneumatic pressure to the single-acting pneumatic cylinder or to the double-acting pneumatic cylinder, whereby the actuating mandrel in the setting spindle is moved out from an initial position, and switching off the pneumatic pressure in the single-acting pneumatic cylinder and spring-resetting the actuating mandrel into the initial position or switching off the pneumatic pressure in a first chamber of the double-acting pneumatic cylinder and adding a pneumatic pressure in a second chamber of the double-acting pneumatic cylinder, thereby moving back the actuating mandrel into the initial position.

9. The installation method according to claim 7, wherein the rotation decoupling connecting unit comprises an electromagnetic actuating member as the second actuating member and wherein the installation method comprises the following step:

forwarding an electric signal to the electromagnetic actuating member whereby the second actuating member is activated and the actuating mandrel is moved out in the setting spindle from an initial position, and switching off the electric signal to the electromagnetic actuating member, whereby the electromagnetic actuating member is moved back and drags along the actuating mandrel into the initial position or whereby the second actuating member and the actuating mandrel are spring reset.

* * * * *